US012812356B2

(12) United States Patent
Ke

(10) Patent No.: US 12,812,356 B2
(45) Date of Patent: Nov. 24, 2026

(54) INFORMATION CONFIGURATION METHOD AND APPARATUS AND COMMUNICATION DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 483 days.

(21) Appl. No.: 18/104,078

(22) Filed: Jan. 31, 2023

(65) Prior Publication Data

US 2023/0179987 A1 Jun. 8, 2023

Related U.S. Application Data

(63) Continuation of application No. PCT/CN2021/110014, filed on Aug. 2, 2021.

(30) Foreign Application Priority Data

Jul. 31, 2020 (CN) ........................ 202010762079.7

(51) Int. Cl.
*H04W 8/18* (2009.01)
*H04W 48/18* (2009.01)

(52) U.S. Cl.
CPC ............. *H04W 8/18* (2013.01); *H04W 48/18* (2013.01)

(58) Field of Classification Search
CPC ............................... H04W 8/18; H04W 48/18
See application file for complete search history.

(56) References Cited

U.S. PATENT DOCUMENTS 12,302,230 B2 * 5/2025 Matolia ................ H04W 60/04
2006/0223503 A1 10/2006 Muhonen et al.
(Continued)

FOREIGN PATENT DOCUMENTS

CN 101594663 A 12/2009
CN 103379654 A 10/2013
(Continued)

OTHER PUBLICATIONS

First Office Action for Chinese Application No. 202010762079.7, dated Jun. 28, 2023, 9 Pages.
(Continued)

*Primary Examiner* — Wayne H Cai
(74) *Attorney, Agent, or Firm* — BROOKS KUSHMAN P.C.

(57) ABSTRACT

An information configuration method and apparatus and a communication device, which relate to the field of wireless communications technologies. The information configuration method includes: obtaining first information, visited network list information of a first type and/or visited network list information of a second type; and performing a first operation according to the obtained information, where the first operation includes at least one of the following: determining a visited network list of a first type configured or updated for a terminal; sending the visited network list information of the first type to the terminal; determining a visited network list of a second type configured or updated for the terminal; deriving a visited network list of a second type according to the visited network list of the first type; or sending the visited network list information of the second type to the terminal.

10 Claims, 3 Drawing Sheets

(56) References Cited

U.S. PATENT DOCUMENTS

| | | | | |
|---|---|---|---|---|
| 2011/0075608 | A1 | 3/2011 | Chai et al. | |
| 2020/0245235 | A1 | 7/2020 | Chun | |
| 2021/0105712 | A1* | 4/2021 | Speicher | H04W 60/04 |
| 2022/0345989 | A1* | 10/2022 | Tiwari | H04W 48/08 |

FOREIGN PATENT DOCUMENTS

| | | | |
|---|---|---|---|
| CN | 104853410 | A | 8/2015 |
| EP | 2276294 | A | 1/2011 |
| WO | 2020092173 | A1 | 5/2020 |

OTHER PUBLICATIONS

International Search Report and Written Opinion for Application No. PCT/CN2021/110014, dated Nov. 3, 2021, 8 Pages.

OPPO "Introducing support for Non-Public Networks and operations on Allowed CAG list" 3GPP TSG-SA WG2 Meeting #131, Spain, Mar. 2019, S2-1901613, 10 Pages.

Samsung, Ericsson, "SNPN subscription data provisioning" SA WG2 Meeting #133, USA, May 2019, S2-1906553, 10 Pages.

Huawei, Hisilicon, "Solution for NPN network access via PLMN" 3GPP TSG SA WG3 (Security) Meeting #94, India, Feb. 2019, S3-190493, 4 Pages.

Nokia, "UE authentication to a Public network integrated NPN" 3GPP TSG-SA WG3 Meeting #94Ad-Hoc, Sweden, Mar. 2019, S3-190853, 3 Pages.

* cited by examiner

INFORMATION CONFIGURATION METHOD AND APPARATUS AND COMMUNICATION DEVICE

CROSS-REFERENCE TO RELATED APPLICATIONS

This application is a continuation of International Application No. PCT/CN2021/110014 filed on Aug. 2, 2021, which claims priority to Chinese Patent Application No. 202010762079.7 filed on Jul. 31, 2020, which are incorporated herein by reference in their entireties.

TECHNICAL FIELD

Embodiments of this application relate to the field of wireless communications technologies, and in particular, to an information configuration method and apparatus and a communication device.

BACKGROUND

In a deployment scenario of a standalone non-public network (standalone non-public network, SNPN), an access scenario in which a terminal may visit the SNPN through a service provider credential is introduced. Therefore, a terminal having a first public land mobile network (Public Land Mobile Network, PLMN) credential may visit a second PLMN or the SNPN through the first PLMN credential. When selecting a network, if currently, there is coverage of both the SNPN and the PLMN, the terminal faces a problem of whether to select the PLMN or the SNPN to access. Therefore, how to implement network selection for the terminal in the scenario is an urgent problem to be resolved at present.

SUMMARY

Embodiments of this application provide an information configuration method and a communication device, to resolve a problem of how to implement network selection for a terminal in a case that an access scenario in which a terminal may visit an SNPN through a service provider credential is introduced.

To resolve the foregoing technical problems, this application is implemented as follows:

According to a first aspect, this embodiment of this application provides an information configuration method, applied to a first communication device, and the method including:

obtaining first information, visited network list information of a first type, and/or visited network list information of a second type, where the first information includes at least one of the following: capability information, a first request, a second request, or a type of visited network list information, where the capability information is used for indicating one of the following: that a terminal has a first capability or that a terminal does not have a first capability; the first capability includes: a capability of the terminal to visit a network through a service provider credential; the first request is used for requesting the visited network list information of the first type; the second request is used for requesting the visited network list information of the second type; and the type of the visited network list information is used for indicating at least one of the following: a first type, where the first type is used for indicating the visited network list information of the first type, or a second type, where the second type is used for indicating the visited network list information of the second type;

performing a first operation according to the obtained information, where the first operation includes at least one of the following: a first-class operation of the first operation or a second-class operation of the first operation, where the first-class operation of the first operation includes at least one of the following:

determining a visited network list of a first type configured or updated for the terminal; or sending the visited network list information of the first type to the terminal; and the second-class operation of the first operation includes at least one of the following:

determining a visited network list of a second type configured or updated for the terminal;

deriving a visited network list of a second type according to the visited network list of the first type; or sending the visited network list information of the second type to the terminal;

the visited network list information of the first type includes: information about a group of preferred first-type networks and/or information about a combination of the first-type networks and an access technology;

the visited network list information of the second type includes: information about a group of preferred second-type networks and/or information about a combination of the second-type networks and the access technology, where the first-type network includes at least one of the following: a standalone non-public network, a public network integrated non-public network, or a public network; and the second-type network includes: the public network.

According to a second aspect, this embodiment of this application provides an information configuration method, applied to a second communication device, and the method including:

sending first information, where the first information includes at least one of the following: capability information, a first request, a second request, or a type of visited network list information;

the capability information is used for indicating one of the following: that a terminal has a first capability or that a terminal does not have a first capability; the first capability includes: a capability of the terminal to visit a network through a service provider credential;

the first request is used for requesting visited network list information of a first type;

the second request is used for requesting visited network list information of a second type; and the type of the visited network list information is used for indicating at least one of the following: a first type, where the first type is used for indicating the visited network list information of the first type, or a second type, where the second type is used for indicating the visited network list information of the second type.

According to a third aspect, this embodiment of this application provides an information configuration apparatus, applied to a first communication device, and the apparatus including:

an obtaining module, configured to obtain first information, visited network list information of a first type, and/or visited network list information of a second type, where the first information includes at least one of the following: capability information, a first request, a second request, or a type of visited network list information, where the capability information is used for indicating one of the following: that a terminal has a first capability or that a terminal does not have a first capability; the first capability includes: a capability of the terminal to visit a network through a service provider credential; the first request is used for requesting the visited network list information of the first type; the second request is used for requesting the visited network list information of the second type; and the type of the visited network list information is used for indicating at least one of the following: a first type, where the first type is used for indicating the visited network list information of the first type, or a second type, where the second type is used for indicating the visited network list information of the second type;

an execution module, configured to perform a first operation according to the obtained information, where the first operation includes at least one of the following: a first-class operation of the first operation or a second-class operation of the first operation, where the first-class operation of the first operation includes at least one of the following:

determining a visited network list of a first type configured or updated for the terminal; or sending the visited network list information of the first type to the terminal; and the second-class operation of the first operation includes at least one of the following:

determining a visited network list of a second type configured or updated for the terminal;

deriving a visited network list of a second type according to the visited network list of the first type; or sending the visited network list information of the second type to the terminal;

the visited network list information of the first type includes: information about a group of preferred first-type networks and/or information about a combination of the first-type networks and an access technology;

the visited network list information of the second type includes: information about a group of preferred second-type networks and/or information about a combination of the second-type networks and the access technology, where the first-type network includes at least one of the following: a standalone non-public network, a public network integrated non-public network, or a public network; and the second-type network includes: the public network.

According to a fourth aspect, this embodiment of this application provides an information configuration apparatus, applied to a second communication device, and the apparatus including:

a sending module, configured to send first information, where the first information includes at least one of the following: capability information, a first request, a second request, or a type of visited network list information;

the capability information is used for indicating one of the following: that a terminal has a first capability or that a terminal does not have a first capability; the first capability includes: a capability of the terminal to visit a network through a service provider credential;

the first request is used for requesting visited network list information of a first type;

the second request is used for requesting visited network list information of a second type; and the type of the visited network list information is used for indicating at least one of the following: a first type, where the first type is used for indicating the visited network list information of the first type, or a second type, where the second type is used for indicating the visited network list information of the second type.

According to a fifth aspect, this embodiment of this application provides a communication device, including a processor, a memory, and a computer program stored in the memory and executable on the processor, where the computer program, when executed by the processor, implements the steps of the information configuration method provided according to the first aspect, or implements the steps of the information configuration method provided according to the second aspect.

According to a sixth aspect, this embodiment of this application provides a readable storage medium, storing a program or instruction, where the program or instruction, when executed by a processor, implements the steps of the information configuration method provided according to the first aspect, or implements the steps of the information configuration method provided according to the second aspect.

According to a seventh aspect, this embodiment of this application provides a computer software product, being stored in a non-volatile storage medium, where the computer software product is configured to be executed by at least one processor to implement the steps of the information configuration method provided according to the first aspect, or implement the steps of the information configuration method provided according to the second aspect.

According to an eighth aspect, this embodiment of this application provides a communication device, configured to perform the information configuration method provided according to the first aspect, or perform the information configuration method provided according to the second aspect.

It is not difficult to understand that through this embodiment, a terminal having a capability of visiting the network through the service provider credential may be supported for network selection.

DETAILED DESCRIPTION

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It may be understood that the data used in such a way is interchangeable in proper circumstances, so that the embodiments of this application can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "/" generally indicates an "or" relationship between associated objects.

It should be noted that, the technology described in this embodiment of this application is not limited to a long term evolution (Long Term Evolution, LTE)/LTE evolution (LTE-Advanced, LTE-A) system, but may further be used in other wireless communication systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access, (Orthogonal Frequency Division Multiple Access, OFDMA), single-carrier frequency-division multiple access (Single-carrier Frequency-Division Multiple Access, SC-FDMA), and other systems. The terms "system" and "network" in this embodiment of this application are often used interchangeably, and the described technologies may be used both for the systems and radio technologies mentioned above and may also be used for other systems and radio technologies. However, the following descriptions describe a new radio (New Radio, NR) system for the objective of being used as an example, and NR terms are used in most of the descriptions below. These technologies may also be applied to applications other than NR system applications, such as a $6^{th}$ generation ($6^{th}$ Generation, 6G) communication system.

Figure 1:
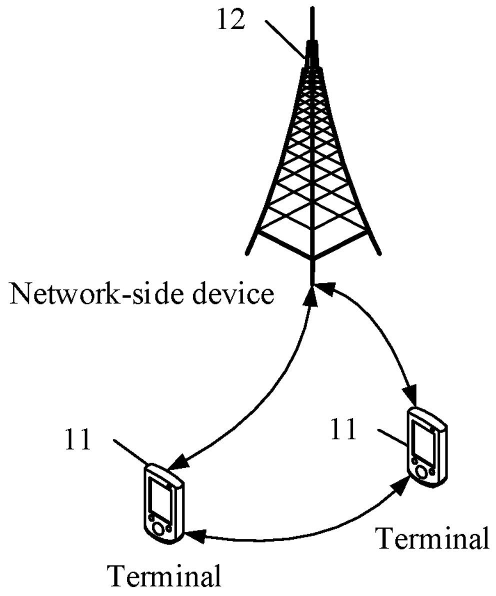
FIG. 1 is a schematic diagram of an architecture of a wireless communication system according to an embodiment of this application.

FIG. 1 is a block diagram of a wireless communication system to which an embodiment of this application may be applied. The wireless communication system includes a terminal 11 and a network-side device 12. The terminal 11 may include a relay supporting a terminal function and/or a terminal supporting a relay function. The terminal 11 may also be referred to as a terminal device or user equipment (User Equipment, UE). The terminal 11 may be a terminal-side device such as a mobile phone, a tablet personal computer (Tablet Personal Computer), a laptop computer (Laptop Computer), or referred to as a notebook computer, a personal digital assistant (Personal Digital Assistant, PDA), a mobile internet device (Mobile Internet Device, MID), a palmtop computer, a netbook, an ultra-mobile personal computer (ultra-mobile personal computer, UMPC), a mobile Internet device (Mobile Internet Device, MID), a wearable device (Wearable Device), or vehicle user equipment (Vehicle User Equipment, VUE), and pedestrian user equipment, (Pedestrian User Equipment, PUE). The wearable device includes: a bracelet, headphones, glasses, or the like. It is to be noted that, in this embodiment of this application, a specific type of the terminal 11 is not limited. The network-side device 12 may be a base station or a core network, where the base station may be referred to as a node B, an evolved node B, an access point, a base transceiver station (Base Transceiver Station, BTS), a radio base station, a radio transceiver, a basic service set (Basic Service Set, BSS), an extended service set (Extended Service Set, ESS), a node B, an evolved node B (Evolved node B, eNB), a household node B, a household evolved node B, a wireless local area network (wireless local area network, WLAN) access point, a wireless fidelity (wireless fidelity, WiFi) node, a transmitting receiving point (Transmitting Receiving Point, TRP) or some other proper terms in the field. Provided that the same technical effect is achieved, the base station is not limited to a specific technical vocabulary. It is to be noted that, in this embodiment of this application, only a base station in the NR system is used as an example, but a specific type of the base station is not limited.

In a deployment scenario of a standalone non-public network (standalone non-public network, SNPN), an access scenario in which a terminal may visit the SNPN (for example, a first SNPN) through a service provider credential (for example, a Public Land Mobile Network, PLMN), a second SNPN credential, or another credential is introduced. In the scenario, a terminal having a first PLMN credential may visit a second PLMN or the SNPN through the first PLMN credential. When selecting a network, if currently, there is coverage of both the SNPN and the PLMN, the terminal faces a problem of whether to select the PLMN or the SNPN to access. However, there is only a priority list of the PLMN in the existing preferred network list controlled by an operator (Operator Controlled PLMN Selector with Access Technology). Therefore, a preferred network list controlled by a service provider (Home SP-controlled prioritized list) needs to be defined, which is a list in which the SNPN and the PLMN are mixed. For example, a priority order is: a PLMN-A, an SNPN 1, a PLMN-B, and an SNPN 2.

A preferred network list controlled by a service provider (hereinafter referred to as visited network list information of a first type) cannot be used together with the existing preferred network list controlled by an operator (hereinafter referred to as visited network list information of a second type). For example, currently, there is coverage of both an SNPN-A and a PLMN-2. The PLMN-2 should be selected according to the visited network list information of the first type, and the SNPN-A should be selected according to the visited network list information of the second type.

To support an access scenario in which the terminal may visit an SNPN (such as a first SNPN) through a service provider credential (such as a PLMN credential, a second SNPN credential, and another credential), the following problems further need to be resolved:

Problem 1: The visited network list information of the first type may be pre-saved on a universal subscriber identity module (Universal Subscriber Identity Module, USIM). A USIM may be inserted into mobile equipment (Mobile Equipment, ME) that supports the visited network list information of the first type, or inserted into ME that does not support the visited network list information of the first type. Currently, a capability of the ME may not be predicted when the USIM is configured. Therefore, after the visited network list information of the first type is introduced, how to support backward compatibility is a problem that needs to be resolved.

Problem 2: A network may configure the visited network list information of the first type to UE, and after receiving the visited network list information of the first type, the UE may save the visited network list information of the first type in the ME. Currently, the network does not know whether the UE supports the visited network list information of the first type.

Problem 3: When the UE visits a non-service provider network through the service provider credential, if the service provider of the UE is to send the visited network list information of the first type to the UE, the non-service provider network may tamper with the visited network list information of the first type.

A solution is that the service provider performs integrity protection on the visited network list information of the first type before sending. For example, the visited network list information of the first type may be sent in a steer of roaming container (such as an SoR container). Because the steer of roaming container already supports integrity protection, there is not a problem.

The other solution is that when the UE visits a non-service provider network through the service provider credential, the service provider does not send the visited network list information of the first type or the terminal discards the received visited network list information of the first type.

In an embodiment of this application, visited network list information is a group of networks sorted according to a priority and/or a combination of the networks and an access technology. The terminal performs network selection according to the visited network list information. There is an agreement between the service provider or home network of the terminal and the visited network, which allows the terminal to access the visited network through the service provider credential or a home network credential.

In an embodiment of this application, the visited network list information is used by the terminal to perform network selection. For example, when the terminal is moved out of the coverage of the home network of the terminal, the terminal performs network selection according to the visited network list information. The visited network list information includes at least one of the following: the visited network list information of the first type or the visited network list information of the second type.

In an embodiment of this application, the visited network list information includes: information of a group of preferred (preferred) networks and/or information of a combination of the networks and an access technology.

In this embodiment of this application, optionally, obtaining may be understood as obtaining from configuration, receiving, receiving after a request is passed, obtaining through self-learning, deriving and obtaining according to information that is not received, or obtaining after processing according to received information, which may be determined according to actual needs. This is not limited in this embodiment of this application. For example, when a specific piece of capability indication information sent by a device is not received, it may be derived that the device does not support the capability.

Optionally, sending may include broadcasting, broadcasting in a system message, and returning after responding to a request.

Optionally, a card may include one of the following: a universal integrated circuit card (Universal Integrated Circuit Card, UICC), an embedded universal integrated circuit card (embedded Universal Integrated Circuit Card, eUICC), a subscriber identity module (Subscriber Identity Module, SIM), or an embedded subscriber identity card (embedded Subscriber Identity Module, eSIM). The SIM card may also be referred to as another name. For example, the SIM card is directly referred to as "card", which is not limited in this application.

In an embodiment of this application, a non-public network is an abbreviation of a non-public network or a non-public network. The non-public network or non-public network may be referred to as one of the following: a non-public communication network or a non-public communication network. The non-public network may include at least one of the following deployment manners: a physical non-public network, a virtual non-public network, or a non-public network implemented on a public network. In an implementation, the non-public network is a closed access group (Closed Access Group, CAG). A CAG may include a group of terminals.

In an embodiment of this application, a non-public network service is an abbreviation of a non-public network service or a non-public network service. The non-public network service or non-public network service may also be referred to as one of the following: a non-public network network service, a non-public communication service, a non-public network communication service, a non-public network network service, or another name. It is to be noted that, a naming manner is not specifically limited in this embodiment of the present invention. In an implementation, the non-public network is a closed access group. In this case, the non-public network service is a network service of the closed access group.

In an embodiment of this application, the non-public network or non-public network may include or be referred to as a private network. The private network may be referred to as one of the following: a private communication network, a private network, a local area network (local area network, LAN), a private virtual network (Private virtual network, PVN), an isolated communication network, a dedicated communication network, or another name. It is to be noted that, a naming manner is not specifically limited in this embodiment of the present invention.

In an embodiment of this application, a public network is an abbreviation of a public network or a public network. The public network or public network may be referred to as one of the following: a public communication network, a public communication network, or another name. It is to be noted that, a naming manner is not specifically limited in this embodiment of the present invention.

In an embodiment of this application, an operator indicates a network operator.

In an optional embodiment of this application, a communication device may include at least one of the following: a communication network element or a terminal.

In an embodiment of this application, the communication network element may include at least one of the following: a network element of a core network or a network element of a radio access network.

In this embodiment of this application, the network element of the core network (core network, CN) may include but is not limited to at least one of the following: a core network device, a core network node, a core network function, a network element of a core network, a mobility management entity (Mobility Management Entity, MME), an access management function (Access Management Function, AMF), a network repository function (Network Repository Function, NRF), a session management function (Session Management Function, SMF), a user plane function (User Plane Function, UPF), a serving gateway (serving gateway, SGW), a public data network gateway (Public Data Network Gateway, PDN Gateway), a policy control function (Policy Control Function, PCF), a policy and charging rules function (Policy and Charging Rules Function, PCRF), a general packet radio service (General Packet Radio Service, GPRS), a serving GPRS support node (Serving GPRS Support Node, SGSN), a gateway GPRS support node (Gateway GPRS Support Node, GGSN), unified data management (Unified Data Management, UDM), a unified data repository, (Unified Data Repository, UDR), a home subscriber server (Home Subscriber Server, HSS), or an application function (Application Function, AF).

The information configuration method in this embodiment of this application is described below.

Figure 2:
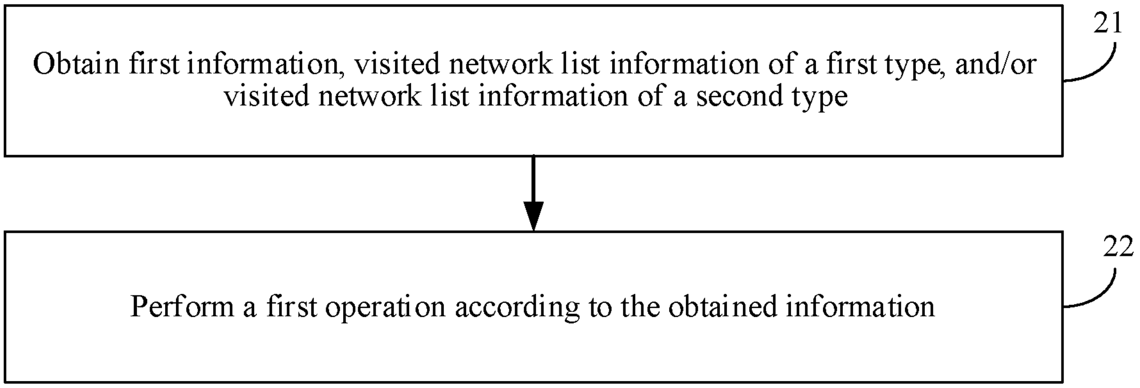
FIG. 2 is a schematic flowchart of an information configuration method according to an embodiment of this application.

Referring to FIG. 2, this embodiment of this application provides an information configuration method, applied to a first communication device; and the first communication device includes but is not limited to: a network device, and a card (such as the UICC, USIM, or SIM). The network device includes but is not limited to one of the following: an AMF (such as an AMF of a visited network of the terminal, an AMF of a home network of the terminal, or an AMF of the service provider) or a UDM (such as a UDM of a home network of the terminal or a UDM of the service provider). The terminal includes one of the following: UE or ME. Optionally, when a first communication device is a network device, the terminal may include UE; and when the first communication device is a card, the terminal may include ME. The UE may be considered as a combination of the card and the ME. The card may be an electronic card or a physical card. As shown in FIG. 2, the method includes:

Step 21. Obtain first information, visited network list information of a first type, and/or visited network list information of a second type.

Optionally, the first information includes at least one of the following: capability information, a first request, a second request, or a type of supported visited network list information. The capability information is used for indicating one of the following: that a terminal has a first capability or that a terminal does not have a first capability. The first capability includes: a capability of the terminal to visit a network through a service provider credential of a service provider. The first request is used for requesting visited network list information of a first type. The second request is used for requesting visited network list information of a second type. the type of the visited network list information is used for indicating at least one of the following: a first type, where the first type is used for indicating the visited network list information of the first type, or a second type, where the second type is used for indicating the visited network list information of the second type.

Optionally, the first communication device (for example, the UDM and/or AMF) may obtain the first information from the terminal (for example, the UE or ME).

Optionally, in the first communication device (for example, the UDM), the visited network list information of the first type and/or the visited network list information of the second type may be configured.

Further, a capability of the terminal to visit the network through the service provider credential includes the capability of the terminal to visit the network of the first type through the service provider credential.

Further, the first-type network may include at least one of the following: a standalone non-public network, a public network integrated non-public network, or a public network. the service provider credential includes one of the following: a public network credential, a non-public network credential, or another credential (such as an OTT credential).

Further, the second-type network includes the public network (such as a PLMN). In an implementation, the second-type network only includes the public network.

Optionally, the visited network list information is used by the terminal to perform network selection. For example, when the terminal is moved out of the coverage of the home network of the terminal, the terminal performs network selection according to the visited network list information. The visited network list information includes at least one of the following: the visited network list information of the first type or the visited network list information of the second type.

1) Optionally, the visited network list information of the first type includes: information about a group of preferred (preferred) first-type networks and/or information about a combination of the first-type networks and an access technology.

Further, the information about a group of preferred first-type networks and/or the information about a combination of the first-type networks and the access technology is information about a group of first-type networks sorted according to a priority and/or information about a combination of the first-type networks and an access technology.

In an implementation, the networks in the visited network list information of the first type and/or a combination of the networks and the access technology are sorted according to a priority, such as a PLMN-1, an SNPN-A, a PLMN-2, and an SNPN-B.

In an implementation, a manner in which the terminal accesses the networks in the visited network list information of the first type is to perform accessing through the service provider credential.

In an implementation, the visited network list information of the first type may be referred to as: preferred network list information controlled by the service provider and/or list information of a combination of preferred networks and an access technology controlled by the service provider.

Further, the information about the first-type networks includes network identification information of the first-type networks, which may include at least one of the following: a network identifier of a standalone non-public network (for example, PLMN+NID), a network identifier of a public network integrated non-public network (for example, PLMN+CAD ID), or a public network identifier (for example, a PLMN ID).

2) Optionally, the visited network list information of the second type includes: information about a group of preferred second-type networks and/or information about a combination of the second-type networks and the access technology.

Further, the information about the group of preferred second-type networks and/or the information about the combination of the second-type networks and the access technology is information about a group of second-type networks sorted according to a priority and/or information about a combination of the second-type networks and an access technology.

In an implementation, a manner in which the terminal accesses the networks in the visited network list information of the second type is to perform accessing through the home network credential of the terminal.

Optionally, the visited network list information of the second type may be referred to as: preferred network list information controlled by the operator and/or list information of a combination of preferred networks and an access technology controlled by the operator.

Further, the information of the second-type network includes network identification information of the second-type network, which may include: a public network identifier (for example, a PLMN ID).

In an implementation, the networks and/or a combination of the networks and the access technology in the visited network list information of the second type is sorted according to a priority, such as a PLMN-1 and a PLMN-2.

It is not difficult to understand that after network information of other networks other than the second-type network is removed from the visited network list information of the first type, the visited network list information of the second type may be derived.

In an implementation, the first communication device may be configured to obtain the visited network list information of the first type. In another implementation, the first communication device may be configured to obtain the visited network list information of the first type and the visited network list information of the second type.

In an implementation, a manner of visiting the network through the service provider credential may not include a manner of a roaming network.

It is to be noted that the service provider may include one of the following: a communication network, a communication network operator, or another service provider outside the communication network. The communication network or the service provider network may include one of the following: a standalone non-public network (for example, an SNPN), a public network integrated non-public network (for example, a PNI-NPN), or a public network (a PLMN).

When visiting the network through the service provider credential, a network type of the visited network is a network of the first type, which may include at least one of the following: a standalone non-public network (such as an SNPN), a public network integrated non-public network (such as a PNI-NPN), or a public network (a PLMN).

Step 22. Perform a first operation according to the obtained information.

The first operation may include at least one of the following: a first-class operation of the first operation or a second-class operation of the first operation.

Further, the first-class operation of the first operation may include at least one of the following:

determining a visited network list of a first type configured or updated for the terminal; or sending the visited network list information of the first type to the terminal.

Further, the second-class operation of the first operation may include at least one of the following:

determining a visited network list of a second type configured or updated for the terminal;

deriving a visited network list of a second type according to the visited network list of the first type; or sending the visited network list information of the second type to the terminal.

In this embodiment of this application, the performing a first operation may include: performing the first-class operation of the first operation in a case that a first condition is met. The first condition includes at least one of the following:

the capability information indicates that the terminal has the first capability, or determines that the terminal has the first capability;

the first request is received, and the first request is used for requesting the visited network list information of the first type;

the first type is received, and the first type is used for indicating the visited network list information of the first type; or a network currently accessed by the terminal is a service provider network.

Optionally, the performing a first operation may include: performing the second-class operation of the first operation in a case that a second condition is met. The second condition includes at least one of the following:

the capability information indicates that the terminal does not have the first capability, or determines that the terminal does not have the first capability;

the second request is received, and the second request is used for requesting the visited network list information of the second type;

the second type is received, and the second type is used for indicating the visited network list information of the second type; or the first condition is not met.

It is not difficult to understand that after network information of other networks other than the second-type network is removed from the visited network list information of the first type, the visited network list information of the second type may be derived.

In this embodiment of this application, a process of the sending the visited network list information of the first type to the terminal may include at least one of the following:

sending the visited network list information of the first type through a steer of roaming container (a steer of roaming container), where a header of the steer of roaming container indicates that the steer of roaming container includes the visited network list information of the first type; or sending the visited network list information of the first type through a container of a first type, where the container of the first type is a container capable of providing integrity protection for the visited network list information of the first type, and the container of the first type is a container other than the steer of roaming container.

Optionally, when a network accessed by the terminal is not a service provider network, or the terminal accesses another network through the service provider credential, the first communication device (for example, the UDM and/or AMF of the service provider) may skip sending the visited network list information of the first type.

In addition, it is to be noted that, in a case that the first communication device is a card, optionally, the first information may be obtained from the terminal (for example, the ME). Optionally, the visited network list information of the first type and/or the visited network list information of the second type may also be obtained based on the configuration of the card. That is, the visited network list information of the first type and/or the visited network list information of the second type are configured on the card.

Optionally, the terminal may send the first information to an AMF (for example, the AMF of the visited network, the AMF of the home network of the terminal, or the AMF of the service provider). The AMF may send the first information to the UDM (such as the UDM of the home network of the terminal or the UDM of the service provider).

It is not difficult to understand that through this embodiment, a terminal having a capability of visiting the network through the service provider credential may be supported for network selection.

Figure 3:
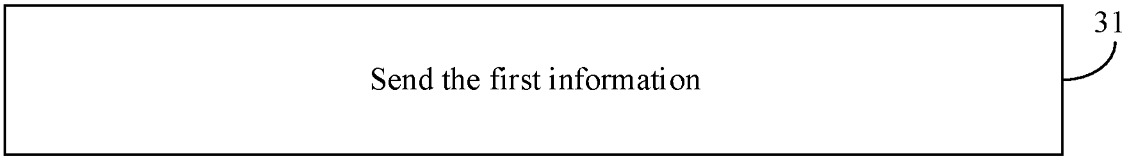
FIG. 3 is a schematic flowchart of another information configuration method according to an embodiment of this application.

Referring to FIG. 3, this embodiment of this application further provides an information configuration method, applied to a second communication device; and the second communication device includes, but is not limited to, a terminal (for example, UE and ME), an AMF (for example, an AMF in a visited network of the terminal), or the like. As shown in FIG. 3, the method includes:

step 31. Send first information.

Optionally, the first information includes at least one of the following: capability information, a first request, a second request, or a type of visited network list information.

the capability information is used for indicating one of the following: that a terminal has a first capability or that a terminal does not have a first capability; The first capability includes: a capability of the terminal to visit a network through a service provider credential of a service provider.

The first request is used for requesting visited network list information of a first type.

The second request is used for requesting visited network list information of a second type.

the type of the visited network list information is used for indicating at least one of the following: a first type, where the first type is used for indicating the visited network list information of the first type, or a second type, where the second type is used for indicating the visited network list information of the second type.

In an implementation, in a case that the second communication device is the ME, the first information may be sent to the card (for example, the UICC, USIM, or SIM).

Optionally, a process of the sending first information may include: sending the capability information, sending the first request, and/or sending the first type in a case that a third condition is met, where the capability information indicates that the terminal has the first capability. The third condition includes at least one of the following:

the terminal has the first capability;

the terminal supports the visited network list information of the first type; or a network currently accessed by the terminal is a service provider network.

Optionally, a process of sending first information may include: sending the capability information, sending the second request, and/or sending the second type in a case that a fourth condition is met, where the capability information indicates that the terminal does not have the first capability. The fourth condition includes at least one of the following:

the terminal does not have the first capability;

the terminal does not support the visited network list information of the first type;

the terminal supports the visited network list information of the second type; or the third condition is not met.

Optionally, after the sending first information, the method further includes:

receiving the visited network list information of the first type.

Optionally, the receiving the visited network list information of the first type may include at least one of the following:

in a case that a fifth condition is met, saving the visited network list information of the first type, and/or updating visited network list information according to the visited network list information of the first type; or discarding the visited network list information of the first type in a case that a sixth condition is met.

The fifth condition includes at least one of the following:

the terminal has the first capability;

the terminal supports the visited network list information of the first type; or the visited network list information of the first type received from a service provider network.

The sixth condition includes at least one of the following:

the terminal does not have the first capability;

the terminal does not support the visited network list information of the first type;

the visited network list information of the first type is received from a non-service provider network.

It is not difficult to understand that through this embodiment, a terminal having a capability of visiting the network through the service provider credential may be supported for network selection.

The method provided in this embodiment of this application is described below with reference to specific application scenarios.

Application Scenario 1

Figure 4:
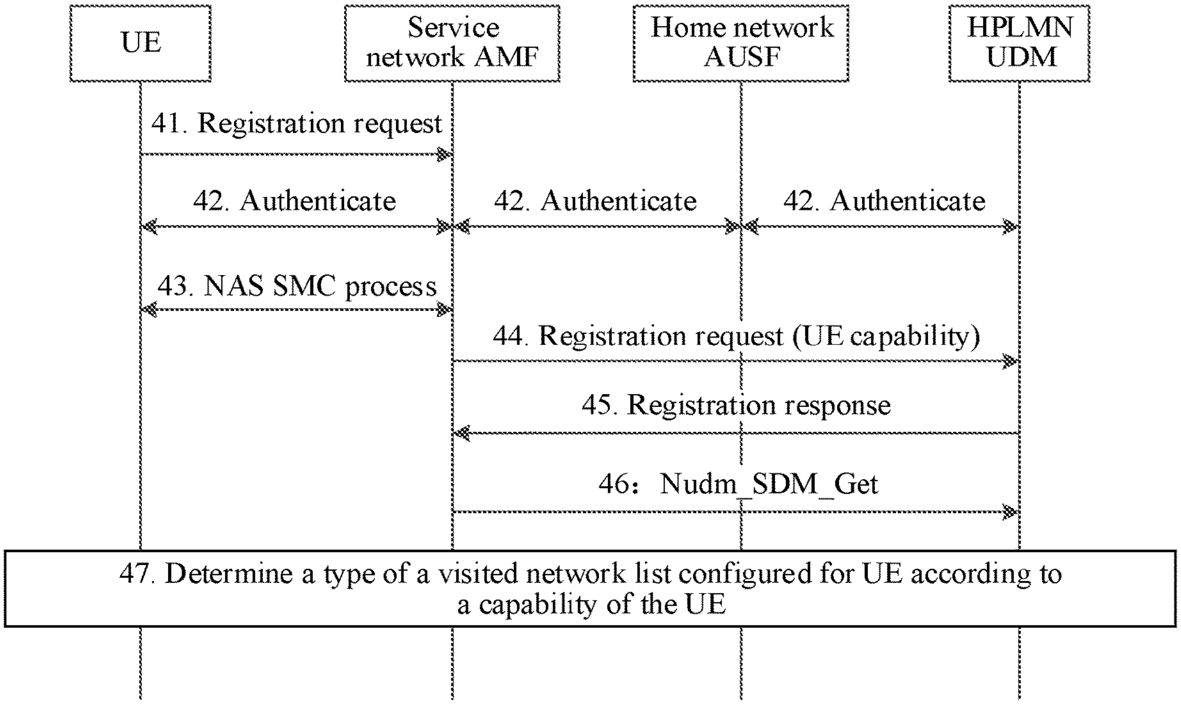
FIG. 4 is a schematic flowchart of an information configuration method of an application scenario 1 according to an embodiment of this application.

In the application scenario, as shown in FIG. 4, a corresponding information configuration process may include:

step 41. The UE sends a registration request to the AMF (such as the AMF in the visited network (such as the PLMN or SNPN)). The request includes capability information, where the capability information is used for indicating that the UE has the first capability or that the UE does not have the first capability; and the first capability includes: the capability of the UE to visit a network (for example, an SNPN) through a service provider credential (service provider credential, SP credential).

Step 42. Authenticate the UE through an interaction process between the UE, the AMF, and the AUSF (for example, the AUSF in the home network (for example, the PLMN or SNPN)) and the UDM.

Step 43. Perform security mode control such as an NAS SMC process between the UE and the AMF.

Step 44. The AMF sends the capability of the UE to the UDM in the home PLMN through a registration request such as Nudm_UECM_Registration.

Step 45. The UDM returns a registration response, such as Nudm_UECM_Registration_Response, to the AMF.

Step 46. The AMF sends a request message such as Nudm_SDM_Get to the UDM, which is used for requesting to obtain subscription information of the UE.

Step 47. The UDM determines a type of the visited network list configured for the UE according to the capability of the UE, such as the visited network list information of the first type or the visited network list information of the second type.

Optionally, when the UE has the first capability, a visited network list of a first type is configured for the UE, such as a visited network list of the service provider credential. The visited network list may include at least one of the following networks: an SNPN, a PNI NPN, or a PLMN.

Optionally, when the UE does not have the first capability, a visited network list of a second type is configured for the UE, such as information of a roaming network list (such as "Operator Controlled PLMN Selector with Access Technology"). The visited network list of the second type only includes the PLMN.

Optionally, the UDM may send the visited network list information of the first type to the UE through a steering of roaming container (Steering of Roaming container, SoR container). In this case, the visited network list information of the first type included in the SoR container may be indicated in an SoR header. For example, 1 bit is used for indicating the visited network list information of the first type.

Application Scenario 2 in the application scenario, the USIM is preconfigured with the visited network list information of the first type and the visited network list information of the second type. The ME having the first capability may invoke the visited network list information of the first type (Home SP-controlled prioritized list), or apply the visited network list information of the first type, while ignoring the visited network list information of the second type (Operator Controlled PLMN Selector). The ME that does not have the first capability may invoke the visited network list information of the second type.

Application Scenario 3 in the application scenario, the USIM is preconfigured with the visited network list information of the first type and the visited network list information of the second type. In addition, the USIM may identify whether the ME has the first capability. The visited network list information of the first type is provided for the ME having the first capability. The visited network list information of the second type is provided for the ME that does not have the first capability.

Figure 5:
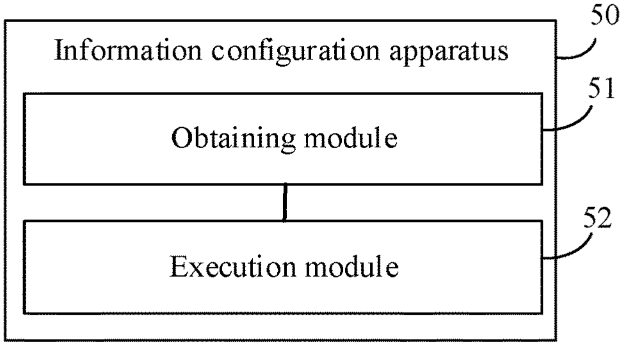
FIG. 5 is a structural diagram of an information configuration apparatus provided in this application.

Referring to FIG. 5, this embodiment of this application provides an information configuration apparatus, applied to a first communication device. As shown in FIG. 5, the information configuration apparatus 50 includes:

an obtaining module 51, configured to obtain first information, visited network list information of a first type and/or visited network list information of a second type, where the first information includes at least one of the following: capability information, a first request, a second request, or a type of visited network list information, where the capability information is used for indicating one of the following: that a terminal has a first capability or that a terminal does not have a first capability; the first capability includes: a capability of the terminal to visit a network through a service provider credential; the first request is used for requesting the visited network list information of the first type; the second request is used for requesting the visited network list information of the second type; and the type of the visited network list information is used for indicating at least one of the following: a first type, where the first type is used for indicating the visited network list information of the first type, or a second type, where the second type is used for indicating the visited network list information of the second type;

an execution module 52, configured to perform a first operation according to the obtained information, where the first operation includes at least one of the following: a first-class operation of the first operation or a second-class operation of the first operation, where the first-class operation of the first operation includes at least one of the following:

determining a visited network list of a first type configured or updated for the terminal; or sending the visited network list information of the first type to the terminal; and the second-class operation of the first operation includes at least one of the following:

determining a visited network list of a second type configured or updated for the terminal;

deriving a visited network list of a second type according to the visited network list of the first type; or sending the visited network list information of the second type to the terminal;

the visited network list information of the first type includes: information about a group of preferred first-type networks and/or information about a combination of the first-type networks and an access technology;

the visited network list information of the second type includes: information about a group of preferred second-type networks and/or information about a combination of the second-type networks and the access technology, where the first-type network includes at least one of the following: a standalone non-public network, a public network integrated non-public network, or a public network; and the second-type network includes: the public network.

Optionally, the execution module 52 is further configured to perform the first-class operation of the first operation in a case that a first condition is met, where the first condition includes at least one of the following:

the capability information indicates that the terminal has the first capability, or determines that the terminal has the first capability;

the first request is received, and the first request is used for requesting the visited network list information of the first type;

the first type is received, and the first type is used for indicating the visited network list information of the first type; or a network currently accessed by the terminal is a service provider network.

Optionally, the execution module 52 is further configured to perform the second-class operation of the first operation in a case that a second condition is met, where the second condition includes at least one of the following:

the capability information indicates that the terminal does not have the first capability, or determines that the terminal does not have the first capability;

the second request is received, and the second request is used for requesting the visited network list information of the second type;

the second type is received, and the second type is used for indicating the visited network list information of the second type; or the first condition is not met.

Optionally, the execution module 52 is configured to execute at least one of the following:

sending the visited network list information of the first type through a steer of roaming container, where a header of the steer of roaming container indicates that the steer of roaming container includes the visited network list information of the first type; or sending the visited network list information of the first type through a container of a first type, where the container of the first type is a container capable of providing integrity protection for the visited network list information of the first type, and the container of the first type is a container other than the steer of roaming container.

Optionally, the execution module 52 is further configured to skip sending the visited network list information of the first type in a case that a network accessed by the terminal is not a service provider network, or the terminal accesses another network through the service provider credential.

In this embodiment, the information configuration apparatus 50 may implement various processes of the method embodiment in FIG. 2, and implement the same beneficial effect, which will not be described in detail herein again to avoid repetition.

Figure 6:
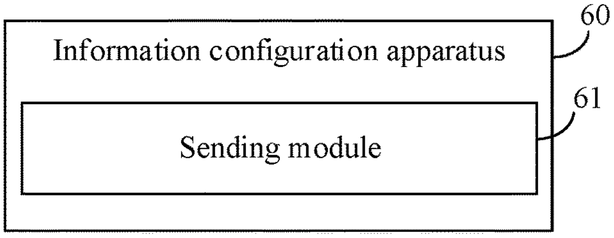
FIG. 6 is a structural diagram of another information configuration apparatus provided in this application.

Referring to FIG. 6, this embodiment of this application provides an information configuration apparatus, applied to a second communication device. As shown in FIG. 6, the information configuration apparatus 60 includes:

a sending module 61, configured to send first information, where the first information includes at least one of the following: capability information, a first request, a second request, or a type of visited network list information;

the capability information is used for indicating one of the following: that a terminal has a first capability or that a terminal does not have a first capability; the first capability includes: a capability of the terminal to visit a network through a service provider credential;

the first request is used for requesting visited network list information of a first type;

the second request is used for requesting visited network list information of a second type; and the type of the visited network list information is used for indicating at least one of the following: a first type, where the first type is used for indicating the visited network list information of the first type, or a second type, where the second type is used for indicating the visited network list information of the second type.

Optionally, the sending module 61 is further configured to send the capability information, send the first request, and/or send the first type in a case that a third condition is met, where the capability information indicates that the terminal has the first capability; and the third condition includes at least one of the following:

the terminal has the first capability;

the terminal supports the visited network list information of the first type; or a network currently accessed by the terminal is a service provider network.

Optionally, the sending module 61 is further configured to send the capability information, send the second request, and/or send the second type in a case that a fourth condition is met, where the capability information indicates that the terminal does not have the first capability; and the fourth condition includes at least one of the following:

the terminal does not have the first capability;

the terminal does not support the visited network list information of the first type;

the terminal supports the visited network list information of the second type; or the third condition is not met.

Optionally, the information configuration apparatus 60 further includes:

a receiving module, configured to receive the visited network list information of the first type.

Optionally, the receiving module is further configured to receive at least one of the following:

in a case that a fifth condition is met, save the visited network list information of the first type, and/or update visited network list information according to the visited network list information of the first type; or discard the visited network list information of the first type in a case that a sixth condition is met, where the fifth condition includes at least one of the following:

the terminal has the first capability;

the terminal supports the visited network list information of the first type; or the visited network list information of the first type is received from a service provider network; and the sixth condition includes at least one of the following:

the terminal does not have the first capability;

the terminal does not support the visited network list information of the first type;

the visited network list information of the first type is received from a non-service provider network.

In this embodiment, the information configuration apparatus 60 may implement various processes of the method embodiment in FIG. 3, and implement the same beneficial effect, which will not be described in detail herein again to avoid repetition.

Figure 7:
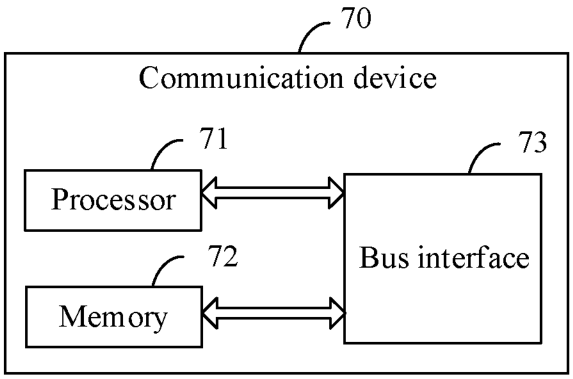
FIG. 7 is a structural diagram of another communication device according to an embodiment of this application.

FIG. 7 is a schematic structural diagram of another communication device according to an embodiment of this application. As shown in FIG. 7, a communication device 70 includes: a processor 71, a memory 72, and a computer program stored on the memory 72 and executable on the processor. Various components in the communication device 70 are coupled together through a bus interface 73. The computer program, when executed by the processor 71, implements the various processes of the method embodiment shown in FIG. 2, or implements the various processes of the method embodiment shown in FIG. 3, and the same technical effects may be achieved. To avoid repetition, details are not described herein again.

This embodiment of this application further provides a computer-readable storage medium, storing a computer program, where the computer program, when executed by a processor, implements the various processes of the method embodiment shown in FIG. 2, or implements the various processes of the method embodiment shown in FIG. 3, and the same technical effects may be achieved. To avoid repetition, details are not described herein again. The computer-readable storage medium is, for example, a ROM (Read-Only Memory, ROM), a RAM (Random Access Memory, RAM), a magnetic disk, an optical disc or the like.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that for convenience and conciseness of description, for specific working processes of the foregoing described system, apparatus and unit, reference can be made to the corresponding processes in the foregoing method embodiments, and details are not described herein.

In the several embodiments provided in this application, it should be understood that the disclosed apparatus and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of the present invention essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present invention.

It may be understood that, the embodiments described in the embodiments of the present disclosure may be implemented by using software, hardware, firmware, middleware, microcode, or a combination thereof. For hardware implementation, a module, a unit, and a sub-unit may be implemented in one or more application-specific integrated circuits (Application Specific Integrated Circuits, ASIC), a digital signal processor (Digital Signal Processing, DSP), a digital signal processing device (DSP Device, DSPD), a programmable logic device (Programmable Logic Device, PLD), a field-programmable gate array (Field-Programmable Gate Array, FPGA), a general purpose processor, a controller, a micro-controller, a microprocessor, and other electronic units configured to execute the functions described in the pretransmitted disclosure, or a combination of the above.

For implementation by software, the technologies in the embodiments of the present disclosure may be implemented by performing the functional modules (for example, a process and a function) in the embodiments of the present disclosure. Software code may be stored in a memory and executed by a processor. The memory may be implemented in the processor or outside the processor.

Although the embodiments of this application have been described above with reference to the accompanying drawings, this application is not limited to the specific implementations described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An information configuration method, performed by a first communication device, and the method comprising:

obtaining first information from a user equipment (UE), wherein the first information comprises: capability information, wherein the capability information is used for indicating that a terminal has a capability to access a standalone non-public network (SNPN) through a credential of a service provider; wherein the service provider is separate from the SNPN;

performing a first operation according to the obtained first information, wherein the first operation comprises: a first-class operation of the first operation wherein the first-class operation of the first operation comprises at least one of the following:

determining an access network list of a first type configured or updated for the terminal; or sending the access network list information of the first type to the terminal through a steer of roaming (SoR) container;

wherein the access network list information of the first type comprises: information about a group of preferred SNPN and/or information about a combination of the SNPN and an access technology;

wherein the first communication device is an access management function (AMF);

wherein the method further comprising:

skipping sending the access network list information of the first type in a case that a network accessed by the terminal is not a network of the service provider, or the terminal accesses another network through the credential of the service provider.

2. The method according to claim 1, wherein the performing a first operation comprises:

performing the first-class operation of the first operation in a case that a first condition is met, wherein the first condition comprises at least one of the following:

the capability information indicates that the terminal has the capability to access the SNPN through the credential of the service provider, or determines that the terminal has the capability to access the SNPN through the credential of the service provider;

a first request is received, and the first request is used for requesting the access network list information of the first type;

the first type is received, and the first type is used for indicating the access network list information of the first type; or a network currently accessed by the terminal is a network of the service provider.

3. The method according to claim 1, wherein a header of the steer of roaming (SoR) container indicates that the steer of roaming (SoR) container comprises the access network list information of the first type.

4. The method according to claim 1, wherein the information about the SNPN comprises: network identifier of the SNPN; wherein the network identifier of the SNPN comprises: a public land mobile network identifier (PLMN ID) and network identifier (NID).

5. An information configuration method, performed by a user equipment (UE), and the method comprising:

sending first information to a first communication device, wherein the first information comprises: capability information;

the capability information is used for indicating that a terminal has a capability to access a standalone non-public network (SNPN) through a credential of a service provider; wherein the service provider is separate from the SNPN;

wherein the first communication device is an access management function (AMF);

wherein after the sending first information, the method further comprises:

receiving an access network list information of a first type from the first communication device;

wherein the access network list information of the first type comprises: information about a group of preferred SNPN and/or information about a combination of the SNPN and an access technology;

wherein in a case that a network accessed by the terminal is not a network of the service provider, or the terminal accesses another network through the credential of the service provider, the first communication device skips sending the access network list information of the first type to the terminal.

6. The method according to claim 5, wherein the sending first information comprises:

sending the capability information in a case that a third condition is met, wherein the capability information indicates that the terminal has the capability to access the SNPN through the credential of the service provider; and the third condition comprises at least one of the following:

the terminal has the capability to access the SNPN through the credential of the service provider;

the terminal supports an access network list information of a first type; or a network currently accessed by the terminal is a network of the service provider.

7. The method according to claim 5, wherein the receiving the access network list information of the first type comprises at least one of the following:

in a case that a fifth condition is met, saving the access network list information of the first type, and/or updating access network list information according to the access network list information of the first type; or discarding the access network list information of the first type in a case that a sixth condition is met, wherein the fifth condition comprises at least one of the following:

the terminal has the capability to access the SNPN through the credential of the service provider;

the terminal supports the access network list information of the first type; or the access network list information of the first type is received from a network of the service provider; and the sixth condition comprises at least one of the following:

the terminal does not have the capability to access the SNPN through the credential of the service provider;

the terminal does not support the access network list information of the first type;

the access network list information of the first type is received from a network of a non-service provider.

8. A first communication device, comprising: a memory, a processor and a computer program stored in the memory and executable by the processor, wherein the processor executes the computer program to:

obtain first information from a user equipment (UE), wherein the first information comprises: capability information, wherein the capability information is used for indicating that a terminal has a capability to access a standalone non-public network (SNPN) through a credential of a service provider; wherein the service provider is separate from the SNPN;

perform a first operation according to the obtained first information, wherein the first operation comprises: a first-class operation of the first operation, wherein the first-class operation of the first operation comprises at least one of the following:

determining an access network list of a first type configured or updated for the terminal; or sending the access network list information of the first type to the terminal through a steer of roaming (SoR) container;

wherein the access network list information of the first type comprises: information about a group of preferred SNPN and/or information about a combination of the SNPN and an access technology;

wherein the first communication device is an access management function (AMF);

wherein the processor executes the computer program to:

skip sending the access network list information of the first type in a case a network accessed by the terminal is not a network of the service provider, or the terminal accesses another network through the credential of the service provider.

9. The first communication device according to claim 8, wherein the processor executes the computer program to:

perform the first-class operation of the first operation in a case that a first condition is met, wherein the first condition comprises at least one of the following:

the capability information indicates that the terminal has the capability to access the SNPN through the credential of the service provider, or determines that the terminal has the capability to access the SNPN through the credential of the service provider;

a first request is received, and the first request is used for requesting the access network list information of the first type;

the first type is received, and the first type is used for indicating the access network list information of the first type; or a network currently accessed by the terminal is a network of the service provider.

10. The first communication device according to claim 8, wherein a header of the steer of roaming (SoR) container indicates that the steer of roaming (SoR) container comprises the access network list information of the first type.

* * * * *